United States Patent

[11] 3,564,160

[72] Inventors Gabor C. Temes
Los Altos;
Peter Bajka, Redwood City, Calif.
[21] Appl. No. 766,749
[22] Filed Oct. 11, 1968
[45] Patented Feb. 16, 1971
[73] Assignee Ampex Corporation
Redwood City, Calif.

[54] D.C. BIAS SERVOMETHOD AND APPARATUS FOR MAGNETIC RECORDING HEADS
10 Claims, 12 Drawing Figs.

[52] U.S. Cl. .......... 179/100.2, 340/174.1
[51] Int. Cl. .......... G11b 5/02, G11b 5/44
[50] Field of Search .......... 179/100.2, 100.2 (K), 100.2 (MI), 100.2 (S), 100.1 (TD); 340/174.1 (TD); 178/6 (BWR), 6.6 (A)

[56] References Cited
UNITED STATES PATENTS

| | | | |
|---|---|---|---|
| 2,634,335 | 4/1953 | Stolaroff | 179/100.2 |
| 2,649,506 | 8/1953 | Gayford et al. | 179/100.2 |
| 2,791,640 | 5/1957 | Wolfe | 179/100.2 |
| 2,816,174 | 12/1957 | Blaney | 179/100.2 |
| 3,217,111 | 11/1965 | Namenyi-Katz | 179/100.2 |

OTHER REFERENCES

Read, The Recording and Reproduction of Sound, 1949, The Testing of Magnetic Tape, pp. 219— 221

*Primary Examiner*—Bernard Konick
*Assistant Examiner*—Raymond F. Cardillo, Jr.
*Attorney*—Robert G. Clay

ABSTRACT: Method and apparatus for servoing the DC bias on magnetic heads of magnetic tape recorders. A signal of selected frequency is recorded and immediately reproduced. The reproduce signal is processed to develop an error signal representative of the distortion of the reproduce signal. A signal representative of the error signal is fed to the record head to control the DC bias.

*INVENTORS*
PETER BAJKA,
GABOR C. TEMES

BY Thomas Schatzel

*ATTORNEY*

D.C. BIAS SERVO METHOD AND APPARATUS FOR MAGNETIC RECORDING HEADS

BACKGROUND OF THE INVENTION

The present invention relates to magnetic tape recorders and in particular to biasing the magnetic heads of such recorders. In wide-band analogue-type recorders, second harmonic distortion frequently reaches an undesirable level. It has been found that this distortion is caused, at least in part, by the external magnetic field about the head assembly. This has been found to be especially true in the case where composite ferrite heads are utilized. Depending on the environment, the degree of distortion is subject to variation by altering the relationship of the head and external magnetic field. Variations may be encountered by physically moving the tape recorder, opening the panel door or bringing magnetic materials near the head. For recorders utilizing all metal heads, it has been found that though they are not as sensitive to external fields, they are frequently subject to magnetization by the turn-on and turn-off transients of the record electronics.

To cope with the problem of even harmonic distortion, it has been the practice to apply a direct current DC bias to the record head. The bias is generally adjustable by mechanical means. A disadvantage with this approach is the bias must be adjusted whenever the transport is moved, the external magnetic field altered, or the degree of magnetization of the head changed. This obviously hinders continuous maintenance of the distortion at a minimum level desirable for optimal performance.

NATURE OF THE PRESENT INVENTION

It is an object of the present invention to provide a servo system for automatically maintaining near optimal, continuous operating conditions of the magnetic heads such that second harmonic distortion is maintained at a minimum. The present system includes provisions for recording a signal of a suitable frequency on a magnetic medium and immediately reproducing said recorded signal to provide a playback signal. The playback signal is processed in alternate electronic paths. In one path the playback signal is passed through a frequency multiplier to provide a reference signal of a frequency equal to the second harmonic frequency. In the other path the second order product is selectively filtered and detected. This harmonic signal amplitude is a function of the amount of second harmonic distortion in the playback signal. An error signal is generated by comparing the reference signal and the harmonic signal. The polarity of the error signal is a function of the phase relationship between the harmonic signal and the reference signal and the amplitude is a function of the amplitude of the harmonic signal. The error signal is fed back to the record heads in proper phase to adjust the net DC bias so as to cause the DC magnetic operating point of the head to shift until the second harmonic distortion is minimized.

BRIEF DESCRIPTION OF THE DRAWINGS

FIGS. 3(A—B), FIGS. 4(A—D) and FIGS. 5(A—D) are waveforms illustrating the operation of the modulator of the system of FIG. 1.

DESCRIPTION OF A PREFERRED EMBODIMENT

Figures 1, 2, 3A, 3B, 4A, 4B, 4C, 4D, 5A, 5B, 5C, 5D:
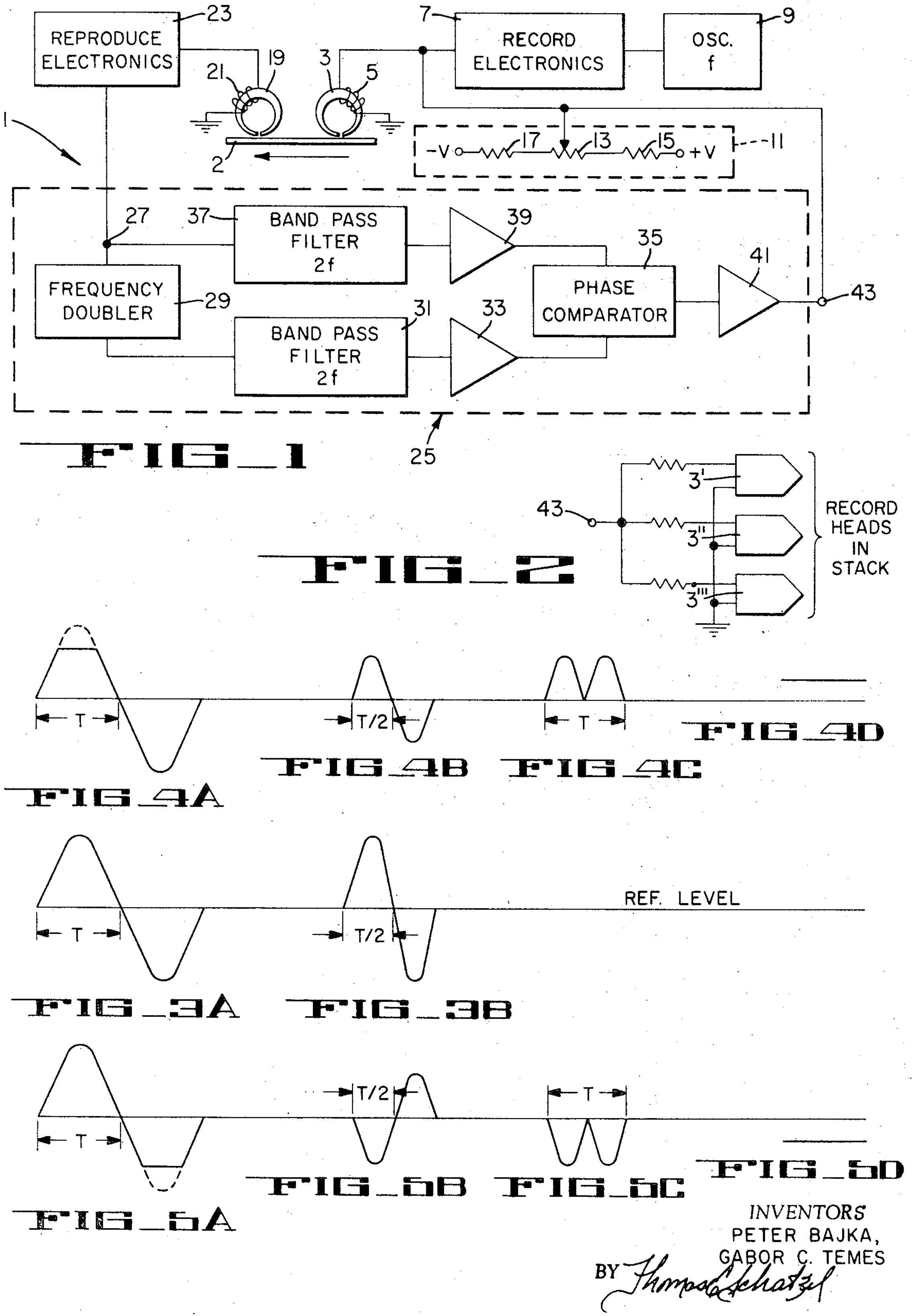
FIG. 1 is a block diagram, in part, of the servoelectronics and record and reproduce heads of an analogue-type recorder incorporating the principles of the present invention.
FIG. 2 is a block diagram to further illustrate that the error signal generated within the system of FIG. 1 may be utilized to bias the various individual heads of the same stack.

The present invention provides a system for automatic continuous adjustment of the DC bias of a record head of a magnetic tape recorder system. The approach compensates for changes in the external magnetic field and/or the magnetization of the record head or of the adjacent parts. The system of FIG. 1, which has been utilized on a 14-channel, wide-band, analogue instrumentation type recorder, provides a servosystem which automatically and continuously monitors and changes the DC bias on the record head assembly so as to keep the second harmonic distortion at a minimum level. Referring more specifically to FIG. 1, various components of a magnetic tape transport, referred to by the general reference character 1 and relevant to an understanding of the present invention, are illustrated in symbolic and block diagram form. The magnetic tape transport includes a record medium in the form of a magnetic tape 2 passing adjacent to a record head assembly 3. The head 3 carries an energizing winding 5 extending to a record electronics bay 7 which in turn extends to an oscillator 9 of a select carrier frequency *f*. The winding 5 is also tied to a DC bias network 11. For illustrative purposes, the DC bias network 11 may include a variable resistance 13 flanked by a pair of fixed resistors 15 and 17. The resistor 15 extends to a positive DC source +V, while the resistor 17 extends to a negative DC source −V.

The magnetic tape 2 also passes adjacent to a reproduce head assembly 19 carrying a coil 21 extending to a reproduce electronics bay 23. The reproduce electronics bay 23 extends to a servoelectronics network referred to by the general reference character 25.

The servoelectronics bay 25 includes an input terminal means represented by the terminal 27. The terminal 27 extends to a first and second path. The first path includes a frequency doubler 29 which in turn extends to a band-pass filter 31, to an amplifier 33 and to a first input of a phase comparator 35, e.g., a ring modulator. In a second path, the terminal 27 extends to a band-pass filter 37 through an amplifier 39 to a second input of the comparator 35. The output of the comparator 35 extends to a DC amplifier 41 which in turn extends to an output terminal 43 of the servoelectronics 25. The output terminal 43 is tied to the winding 5 of the record head assembly 3.

In the system of FIG. 1 the static DC bias of the record head 3 may be set to a select value by adjusting the resistor 13. To realize servoing of the DC bias level a clock signal of a frequency *f* from the oscillator 9 is processed through the record electronics 7 and recorded on one recording track of the magnetic tape 2. The recorded signal *f* is immediately reproduced by means of the reproduce head 19 which is positioned to sense the track common to the record head 3. The induced signal on the winding 21 is then processed by the reproduce electronics 23 to generate a representative playback signal. The playback signal of fundamental frequency *f* appears at the input terminal 27 of the servoelectronics 25. The playback signal is processed through the first and second paths of the servo electronics 25. In the second path, the second harmonic component of the playback signal *f* is selected via the band-pass filter 37, amplified by the amplifier 39 and received by the comparator 35. In the first path a signal of the second harmonic frequency and phase related to the recorded carrier signal is generated. The playback signal is passed through a frequency doubler 29 to generate a signal of a frequency **2*f*. The signal is processed through the band-pass filter 31 and amplified by the amplifier 33 to serve as a reference signal of the second harmonic frequency 2*f*. The reference signal is then received by the comparator 35 also receiving the second harmonic signal from the amplifier 39. The comparator 35 may be so designed that its output is in the form of a full-wave signal having a DC component when a second harmonic signal is present. For example, a ring modulator type comparator 35 provides an output signal which is a product of its input signals. Hence, in the absence of second harmonic distortion, i.e., a zero second harmonic signal, the DC component of the full-wave signal provided by the comparator 35 will be zero. However, when second harmonic distortion is present, hence, a second harmonic signal is received by the comparator 35, a full-wave signal is provided having a DC component whose polarity is a function of the phase relationship between the second harmonic signal and the reference signal and whose magnitude is a function of the amplitude of the second harmonic signal. Since the amplitude of the referenced signal is constant, the magnitude of the DC component depends only upon the amplitude of the second harmonic signal. The average DC component of the full-wave signal may then be amplified by the lowpass filter-amplifier 41 to provide a signal at the output terminal 43. The signal at the terminal 43 is fed back in the proper phase to the DC bias terminal of the winding 5 of the record head 3. As illustrated by FIG. 2 in the case of a record head assembly having a multiple of heads adapted to record on the tape 2, the same error signal appearing at the terminal 43 may be fed back to any one or all of the energizing coils of the other record heads 3', 3'', 3''', etc. in the same stack. Each may include a separate static DC bias adjustment analogous to that of the network 11** to make adjustments for characteristics inherent to the individual head and setting the static DC bias to a select level.

FIGS. 3(A—B), FIGS. 4(A—C) and FIGS. 5(A—C), depict idealized waveforms for further illustrating the theory of operation of the present invention. FIG. 3(A) illustrates the fundamental component of the playback signal of frequency $f$ appearing at the input terminal 27 and having a time period 2T. This signal also represents the recorded signal originating with the oscillator 9. FIG. 3(B) illustrates the fundamental of the playback signal after being frequency doubled by the doubler 29, filtered by the filter 31, amplified and received by the comparator 35. The second order products of the playback signal may be either positive or negative relative to the fundamental. FIG. 4(A) represents one possibility of a playback signal at the terminal 27 having second harmonic distortion. The band-pass filter 37, having a passband centered around the frequency $2f$ provides a signal taking the form of FIG. 4(B) when receiving a signal of the form of FIG. 4(A). The amplitude and phase of this signal is a function of the corresponding quantities of second harmonic distortion. After amplification by the amplifier 39 the signal 4(B) is received by the comparator 35. The comparator 35 responds to the received signals of FIG. 3(B) and FIG. 4(B) to provide a full-wave rectified signal of the format of FIG. 4 (C). The lowpass filter-amplifier network 41 then amplifies the DC average of the full-wave signal to provide a DC signal at the terminal 43 taking the form of FIG. 4(D).

FIG. 5(A) represents another possibility of a playback signal at the terminal 27. In the event the playback signal at the terminal 27 has distortion of the form illustrated by FIG. 5(A) the output of the filter 37 takes the form illustrated by FIG. 5(B) which is of opposite polarity of that of FIG. 4(B). The comparator 35 then receiving the signals of FIGS. 3(B) and 5(B) generates a full-wave signal of the form of FIG. 5(C). The lowpass filter-amplifier 41 then provides an output signal at the terminal 43 in the form of FIG. 5(D).

As illustrated by FIG. 2 and previously discussed, the error signal generated at the terminal 43 may be applied to other individual heads on the transport 1. Thus, for example, in a multiple head stack, only one channel need be utilized to generate the bias error signal with said signal controlling the bias to a multiple of heads. Furthermore, by properly selecting the value of the frequency $f$ of the oscillator 9, the channel selected for use in generating the error signal may be utilized for other purposes. For example, the same channel may be used for flutter correction or recording audio signals.

I claim:

1. A method of controlling the direct current bias on a record head assembly of a magnetic tape recorder system, the steps comprising:

a. sensing the content of a second harmonic frequency signal of a playback signal;

b. comparing the sensed second harmonic frequency signal to a reference signal to provide an error signal representative of the content of the sensed second harmonic frequency; and c. varying the direct current bias on a record head of the record assembly responsive to the error signal.

2. The method of claim 1 further including the step of setting the static direct current bias of the record head to a select level about which it is varied in response to the error signal.

3. The method of claim 1 in which the error signal is generated by:

a. generating a reference signal of a frequency twice the fundamental frequency of the playback signal; and b. comparing the phases of the reference signal and the sensed second harmonic frequency signal of the playback signal to generate the error signal having a direct current component responsive to the relative phase relationship of the reference signal frequency and second harmonic signal frequency.

4. The method of claim 3 in which the reference signal is generated by:

a. sensing the fundamental frequency of the playback signal; and b. doubling the fundamental frequency to provide the reference signal.

5. The method of claim 1 further including the steps of:

a. energizing a record head of the record head assembly with a record signal of a selected frequency to effect recording the record signal on a magnetic record medium; and b. immediately reproducing the record signal from the magnetic record medium to provide the playback signal.

6. The method of claim 5 for controlling the direct current bias on each of a plurality of record heads forming the record head assembly in which one of the record heads is energized to effect recording of the record signal, and the direct current bias on all of the record heads of the record assembly is varied in response to the error signal.

7. A direct current bias servosystem for the magnetic head assembly of a magnetic recording system comprising in combination:

means for generating a signal of a select frequency and applying said signal to the energizing coil of a record head for recording on a magnetic medium;

reproducing means for reproducing the recorded signal to provide a playback signal from said medium;

means for detecting the content of a second harmonic frequency signal of the playback signal;

means for comparing the detected second harmonic frequency signal to a reference signal to provide a direct current error signal representative of the content of the detected second harmonic frequency signal; and means for varying the degree of direct current bias of the record head responsive to the direct current error signal.

8. The system of claim 7 in which the means for detecting the second harmonic content includes a filter designed to pass the second harmonic frequency component of the playback signal; and further comprising a frequency doubler means receiving the playback signal and providing the reference signal at twice the fundamental frequency of the playback signal; and in which the comparator means provides a direct current error signal of a polarity representative of the phase relationship of the reference signal and the component and having an amplitude representative of the content of the second harmonic component.

9. The system of claim 8 further including means for setting the static direct current bias level of said record head.

10. The system of Claim 9 in which the head assembly includes a plurality of individual heads and further including means for varying the degree of direct current bias on a multiple of said heads responsive to said error signal.